(12) United States Patent
Cheung et al.

(10) Patent No.: US 10,894,583 B2
(45) Date of Patent: Jan. 19, 2021

(54) BREAK RESISTANT COMPOSITE STRINGER SYSTEM

(71) Applicant: Rightfair Group Limited, Hong Kong (CN)

(72) Inventors: Kwong Kee Cheung, Los Alamitos, CA (US); Wah Kan Cheung, Richmond Hill (CA)

(*) Notice: Subject to any disclaimer, the term of this patent is extended or adjusted under 35 U.S.C. 154(b) by 0 days.

(21) Appl. No.: 16/672,835

(22) Filed: Nov. 4, 2019

(65) Prior Publication Data

US 2020/0377181 A1    Dec. 3, 2020

Related U.S. Application Data

(60) Provisional application No. 62/854,187, filed on May 29, 2019.

(51) Int. Cl.
*B63B 32/50* (2020.01)
*B32B 5/24* (2006.01)
*B32B 5/26* (2006.01)
*B32B 5/32* (2006.01)
*B32B 21/04* (2006.01)

(52) U.S. Cl.
CPC ............. *B63B 32/50* (2020.02); *B32B 5/245* (2013.01); *B32B 5/26* (2013.01); *B32B 5/32* (2013.01); *B32B 21/042* (2013.01); *B32B 21/047* (2013.01); *B63B 2231/34* (2013.01); *B63B 2231/52* (2013.01)

(58) Field of Classification Search
CPC ..... B63B 35/79; B63B 35/7906; B63B 32/50; B63B 2231/34; B63B 2231/52; B32B 5/245; B32B 5/26; B32B 5/32; B32B 21/042; B32B 21/047; B32B 5/24; B32B 5/18; B32B 5/02; B32B 7/02; B32B 7/12; B32B 27/12; B32B 27/30; B32B 27/36; B32B 27/38
USPC ....................................................... 441/65, 74
See application file for complete search history.

(56) References Cited

U.S. PATENT DOCUMENTS 9,045,201 B1   6/2015   Kuzmarskis et al.
2008/0210137 A1   9/2008   Cox
(Continued)

FOREIGN PATENT DOCUMENTS

AU   2003200943   10/2003
CN   20152113987.2   12/2015
(Continued)

*Primary Examiner* — Lars A Olson
(74) *Attorney, Agent, or Firm* — Clement Cheng

(57) ABSTRACT

A break resistant composite stringer system for a sports board includes an elongated stringer body. An upper U channel is fibrous and includes an upper U channel right flange and an upper U channel left flange. The upper U channel right flange is vertically oriented and the upper U channel left flange is vertically oriented. An inside surface of the upper U channel is bonded to the stringer right surface, the stringer top surface, and the stringer left surface. A lower U channel is fibrous and includes a lower U channel right flange and a lower U channel left flange. The lower U channel right flange is vertically oriented and the lower U channel left flange is vertically oriented. An inside surface of the lower U channel is bonded to the stringer right surface, the stringer bottom surface, and the stringer left surface.

8 Claims, 6 Drawing Sheets

(56) References Cited

U.S. PATENT DOCUMENTS

| | | | |
|---|---|---|---|
| 2008/0293315 A1* | 11/2008 | Yeh | B63B 32/57 441/65 |
| 2017/0190394 A1* | 7/2017 | Cheung | B32B 5/18 |
| 2019/0144084 A1 | 5/2019 | Bowen | |

FOREIGN PATENT DOCUMENTS

| | | |
|---|---|---|
| CN | 201511014653.6 | 12/2015 |
| JP | 2018003695 A | 1/2018 |

* cited by examiner

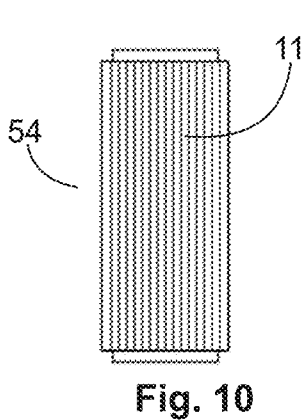
Fig. 10
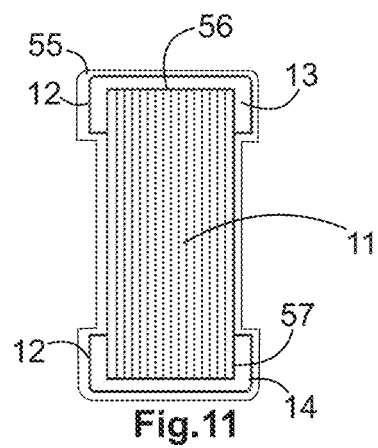
Fig. 11
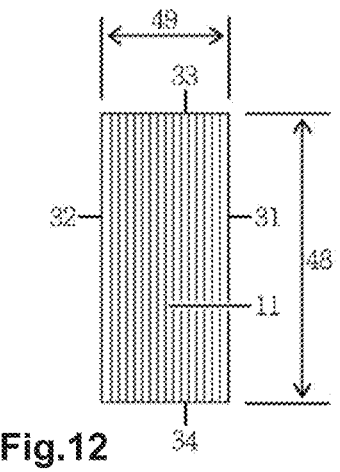
Fig. 12
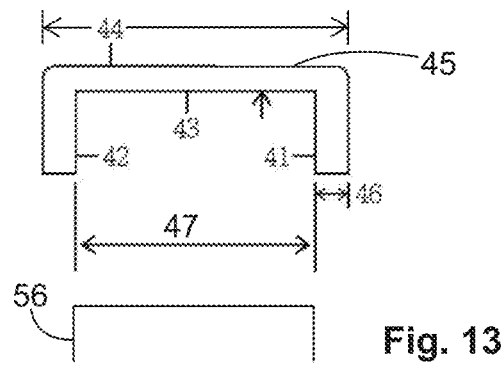
Fig. 13
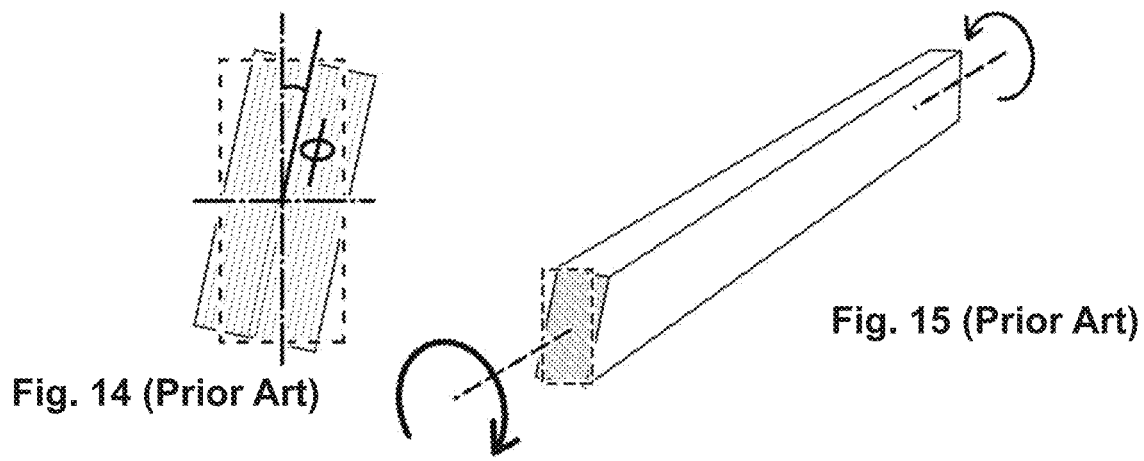
Fig. 14 (Prior Art)
Fig. 15 (Prior Art)

BREAK RESISTANT COMPOSITE STRINGER SYSTEM

FIELD OF THE INVENTION

This invention relates generally to sports boards, and more particularly to surfboards equipped with a break resistant composite stringer system.

DISCUSSION OF RELATED ART

Surfboards are recreational sporting goods and helpful equipment for surfing in the ocean. Because surfboards are intended for use in a standing position, surfboard structures must be reinforced for high stiffness and break resistance. Surfboard structures include fiberglass surfboards and non-fiberglass surfboards.

A fiberglass surfboard structure typically uses a low density foam encased on both the deck surface and bottom surface with a hard coating of fiberglass cloth and resin. This type of surfboard has a hard surface and is usually referred as hard surfboard. Typical foam materials include expanded polystyrene foam (EPS) and polyurethane foam (PU). The foam blank can incorporate a stringer system for controlling flex and reinforcing strength of the entire surfboard. Typically a centerline stringer formed of balsa wood is sandwiched between two halves of a foam structure. Both the top edge and the bottom edge of the wood stringer are connected to the resin coating of the top surface and bottom surface of the surfboard. In general, the wood channel stringer has a thickness typically in the range of 5 mm and provides a minor role to the strength of surfboard. The strength of the hard surfboard is mainly from the hard outer shell of fiberglass cloth and resin.

Non-fiberglass surfboards usually do not utilize any resin impregnated fibers in the layered structure. Typically, this type of surfboard comprises a bottom non-foam plastic plate and a deck foam skin. The surfboards have a soft foam skin on the deck and therefore are usually referred as soft surfboards. This type of surfboards is usually not reinforced by an outer surface fiberglass resin hard coat. Therefore, the strength of surfboard depends more on the strength and stiffness of stringer system within the foam core. The stringer of a soft surfboard is usually bow shaped for improved hydrodynamic performance with an upturned nose and tail, which are commonly called the nose rocker and tail rocker of a surfboard.

The current non-fiberglass surfboard construction has some drawbacks. When incorporating fiberglass sheet or tube into a surfboard foam core as stringers, these stringers cannot extend to the ends of the nose rocker and the tail rocker. The two ends of surfboard are therefore more prone to breaking, in particular in the case of long surfboards.

A conventional stringer system may provide an I-Beam stringer, as such a shape greatly increases the lateral breaking resistance of the surfboard into which it is installed. Although an I-beam made of aluminum, or fibrous materials may be more desirable in terms of strength, the heavy weight and high cost of such an I-Beam makes them prohibitive. In addition, the manufacture of I-Beam stringer in a bow shape is unnecessarily complex and expensive.

Other structures have been attempted. For example in United States patent publication US20080210137 published Sep. 4, 2008, entitled Surfboard Stringer Reinforcing System, by Cox, the disclosure of which is incorporated by reference, describes a wooden U shaped channel 46, 56 held by screws 90 and glue 58. Cox may still have the problem that the wooden stringer members delaminate.

For example, in United States patent publication US20170190394 to Kwong Kee Cheung published Jul. 6, 2017, a Break Resistant Composite Stringer System is described. The applicant incorporates the patent publication disclosures by reference. The composite Stringer System has a stringer body with a stringer top surface and stringer bottom surface, an upper fibrous strip adhered to the stringer body at the stringer top surface, and a lower fibrous strip adhered to the stringer body at the stringer bottom surface. A heat resistant waterproof adhesive resin is bonded between the fibrous channels and the stringer body. In the second preferred embodiment of the stringer system, a second upper fibrous strip is adhered to stringer top surface, and a second lower fibrous strip is adhered to the stringer lower surface. The composite stringer system exhibits higher stiffness and flex recovery and therefore improving the break resistance of the surfboard. The construction of composite stringer system is illustrated in FIG. 10. The stringer described in United States patent publication US20170190394 has some drawbacks. The design reacts to a bending force during ocean surfing in a way that sometimes breaks. Under the weight of a rider and the impact from large waves, the stringer has a torsional influence as shown in FIG. 14, which is a schematic diagram to illustrate the twisting of wood stringer beam when it is subjected to a twisting moment during surfing.

When both a bending force and a torsion force are applied to a structural member like a wood stringer beam, the cross-section will warp in addition to twisting. If the member is allowed to warp freely, then the applied torque is resisted entirely by torsional shear stresses. The maximum shearing stresses will be experienced at the top surface of the beam. In many cases, fracture will initiate at the top surface of the wood beam at position about the middle part of the surfboard illustrated in FIG. 16. The failure mode can be caused by torsional shear stresses.

As explained above in the disclosure of Cheung, the application of a rectangular cross-section fibrous strip to the top surface and/or bottom surface of the wood stringer beam will improve the flexural strength of the stringer system in the transverse direction. It is because the warping deformation of the wood beam is constrained by the fibrous strip. When warping deformation is constrained, the wood beam and the fibrous strip members undergo non-uniform torsion. When the impact force from large waves reaches a magnitude, the non-uniform torsional force will bend the stringer system in the transverse direction. The deformation response of the composite stringer system under the non-uniform torsional force is a combination of twisting deformation illustrated in FIG. 14 and a bending deformation in the transverse direction illustrated in FIGS. 16, 17, 18 and 19. When the composite stringer system experiences a bending deformation in the transverse direction, a compression force develops in the right side of the stringer system as illustrated in FIG. 17. The compression force on the fibrous strip may cause a buckling failure of the strip in the right edge of the stringer. As a result, fibrous strips subjected to warping may depart from the top surface of the stringer body where the torsional shear stresses has the highest value.

The buckling failure mode of the fibrous strip is demonstrated in FIGS. 19 and 20. It should be emphasized that once the fall apart of the fibrous strips happens, the warping deformation of the wood stringer beam will no longer be constrained by the fibrous strip. The wood stringer beam will fracture after the fibrous strip delaminates from the wood stringer beam.

SUMMARY OF THE INVENTION

A sports board has a sports board front end, and a sports board rear end. A break resistant composite stringer system includes an elongated stringer body having a stringer top surface, a stringer bottom surface, a stringer left surface and a stringer right surface. An upper U channel is fibrous and includes an upper U channel right flange and an upper U channel left flange. The upper U channel right flange is vertically oriented and the upper U channel left flange is vertically oriented. An inside surface of the upper U channel is bonded to the stringer right surface, the stringer top surface, and the stringer left surface. A lower U channel is fibrous and includes a lower U channel right flange and a lower U channel left flange. The lower U channel right flange is vertically oriented and the lower U channel left flange is vertically oriented. An inside surface of the lower U channel is bonded to the stringer right surface, the stringer bottom surface, and the stringer left surface. A foam core covers the break resistant composite stringer system. The foam skin covers the foam core.

The inner bottom foam layer is laminated to a lower surface of the foam core. The outer bottom foam layer is laminated to the inner bottom foam layer. The plastic plate is laminated to the outer bottom foam layer. The stringer body has a width in the range of 5 mm to 30 mm. The web width of the fibrous channels has a dimension substantially equal to a width of the stringer body. The upper fibrous channel and the lower fibrous channel are both made of fiberglass. The elongated stringer body is made of wood having a grain parallel to the upper U channel, and parallel to the lower U channel. In another preferred embodiment, the elongated stringer body is made of a laminated bamboo board composed of a number of long bamboo strips vertically piled side by side on the thickness surface of bamboo strips and the strips being aligned substantially in parallel to the longitudinal axis of surfboard. The upper fibrous channel and the lower fibrous channel preferably both have a web thickness in the range of 0.5 mm to 5 mm, a flange thickness in the range of 0.5 mm to 6 mm, a web width in the range of 5 mm to 30 mm and a flange height in the range of 3 mm to 30 mm.

The present invention relates generally to sports board such as a surfboard. This present invention seeks to solve the above problems by providing a break resistant composite stringer system and surfboard. The composite stringer system exhibits higher stiffness and flex recovery and therefore the surfboard is more fracture resistant, greatly enhancing safety for surfboard riders. The present invention provides a break resistant composite stringer system, comprising: a stringer body and fibrous U channels adhered on the top surface and/or bottom surface of the stringer body. Preferably, the stringer body has at least one upturning end whereas the fibrous channels extend to the two ends of the stringer body and adhere thereon. The fibrous U channel has a web section and two flange sections. Preferably, the fibrous channels have a length equal or shorter than the stringer body. Preferably, the web width of fibrous channels has a dimension substantially equal to the width of the stringer body. Preferably, a first layer of heat resistant waterproof adhesive resin is bonded between the fibrous channels and the stringer body. Preferably, after the fibrous channels being bonded to the stringer body by the first layer of heat resistant adhesive layer, the entire composite stringer is covered with a second layer of waterproof adhesive.

The break resistant surfboard is equipped with the above break resistant composite stringer system, having a foam core, a stringer system evenly distributed within the foam core, and a top laminated foam skin covering the top and side rail surface of the foam core. The top laminated foam skin has at least one layer of expanded foam. A bottom laminated foam skin covers the bottom surface of the foam core. The bottom laminated foam skin has at least one layer of expanded foam and a non-foaming plastic plate is laminated to the outer surface of the bottom foam skin. The stringer is a break resistant composite stringer system. The break resistant stringer system has a length shorter than the foam core.

The present invention has the following advantages over the cited prior art:

1. The fibrous channels 12 adhered on the stringer top surface 33 and/or stringer bottom surface 34 are relatively thin and therefore flexible, allowing the channels to bend and extend to the two ends of the stringer body 11 and maintain intimate contact with the curved surface of the stringer body 11. The fibrous channels 12 provide reinforcement to stiffen the stringer. Nevertheless the fibrous channels 12 are relatively thin and the weight of the two channels adds very little weight to the stringer.

2. The tensile strength of fibrous channel 12 is higher than the stringer body 11. When the fibrous channels 12 are bonded to the stringer body 11 as a unified body, the fibrous channels 12 can greatly inhibit the deformation of the stringer body 11 in the vertical direction.

3. The fibrous channel 12 has a U-shaped cross-section, the width of the web section being larger than the thickness. When the fibrous channels 12 are bonded to the stringer body 11 as a unified body, the fibrous channels 12 can greatly inhibit the deformation of the stringer body 11 in the transverse direction and therefore significantly increase the breaking strength of the stringer body 11.

Stringer materials for soft surfboard 2 are usually selected from resin laminated bamboo board, plywood board and timber board and these boards are cut to the shape of stringers. Plywood, oriented strand board or other engineered lumber product incorporate oriented strands of wood fiber bonded with an adhesive and cured in a hot platen press. In the case of bamboo board, segments of bamboo are bonded with an adhesive and cured in a hot platen press. Traditionally, stringers have been made from plywood or hard wood boards. Unlike a hard surfboard, a wood stringer of the present invention preferably does not extend to the foam core bottom surface 27 or the foam core top surface 26. The top skin 16 and bottom skin 17 have a layer structure of flexible foam sheets which are prompted to permanent deformation by collapse of foam cells under a prolonged compression force against the hard wood stringer. As a result, wood stringers of soft surfboard are usually encapsulated by the foam core 21 and therefore the height of wood stringers in the vertical direction is limited by the thickness of surfboard foam core 21. This in terms limits the design of using a wood stringer having a height dimension in the vertical direction same as the thickness of foam core 21 in a soft surfboard. Therefore it is desirable to provide soft surfboards with a stringer system of higher flexural strength in the vertical direction under the same dimensions of stringers.

The impact from large waves can cause board breaking problems. Such impacts will trigger the stringer to deform in both the vertical direction and the lateral direction. If the impact forces are strong enough and exceed the breaking strength of the wood stringer either in the vertical direction or the lateral direction, the surfboard 2 fails by fracture and may cause hazard to user. A typical wood stringer in a soft surfboard has a width dimension less than a height and therefore such a stringer provides little resistance to such flexing in the lateral direction and has maximum bending moment roughly at the middle section of the stringer. The fracture problem is caused by the lower flexural strength of stringers made from plywood board, timber board and resin laminated bamboo board compared to fibrous materials. The flexural strength of stringer can be effectively improved to avoid board fracture if, for example, the thickness (horizontal direction) of the stringer is increased. However such a change will considerably increase the weight of stringer and is not favorable for the surfboard application. It is desirable to provide surfboards with improved lateral stiffness and break resistant property to enhance durability of the boards particularly in harsh wave conditions. There is a need for an improved stringer system which greatly increases the stiffness and breaking strength of surfboard and such a system would not significantly increase the cost or complexity of manufacturing such a surfboard.

Soft surfboards are originally designed for beginner users. However there are demands for performance soft surfboards designed for more experienced surfers. These performance soft boards are lighter and in most cases have a thinner foam core 21 than conventional soft surfboards. As the foam core 21 is thin, the height of stringers is further limited, affecting the stiffness of the surfboard 2. It is therefore desirable to provide a soft surfboard with a high stiffness stringer within a thin foam core 21.

BRIEF DESCRIPTION OF THE DRAWINGS

FIG. 10 is a cross-sectional view of the stringer system, showing fiberglass strips and wood stringer body.

FIG. 11 is an exploded cross-sectional view of another preferred embodiment of the stringer system.

FIG. 12 is a cross section view of a conventional wood stringer of fiberglass hard surfboard, illustrating the dimensions of stringer.

FIG. 13 is a cross section U channel of the present invention, illustrating the dimensions of fibrous channel.

FIG. 14 is a diagram showing torsion displacement on a stringer.

FIG. 15 is a diagram showing torsion force and torsion displacement on a stringer.

Figure 1:
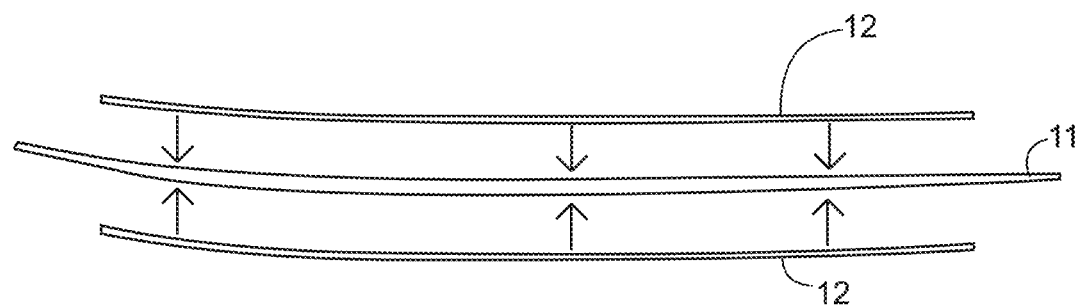
FIG. 1 is a side view of the stringer system, illustrating the primary assembly step.

The following call out list of the elements can be a useful guide in referencing the element numbers of the drawings.
1 composite stringer
2 surfboard
11 stringer body
12 fibrous channels
13 upper fibrous channel
14 lower fibrous channel
15 composite stringer channel
16 top skin
17 bottom skin
21 foam core
22 foam skin
23 plastic plate
24 inner bottom foam layer
25 outer bottom foam layer
26 foam core top surface
27 foam core bottom surface
28 foam core right rail surface
29 foam core left rail surface
31 stringer right surface
32 stringer left surface
33 stringer top surface
34 stringer bottom surface
35 rebound clips
36 stringer front end
37 stringer rear end
38 surfboard front end
39 surfboard rear end
41 channel right flange
42 channel left flange
43 inner web surface of channel
44 channel width dimension
45 channel web thickness dimension
46 channel flange thickness
47 channel web width dimension
48 channel height dimension (flange height)
49 outer web surface of channel 54 wood stringer of a conventional hard surfboard
55 second layer of heat resistant waterproof adhesive
56 upper fibrous channel adhesive layer
57 lower fibrous channel adhesive layer
58 stringer body height dimension
59 stringer body width dimension
61 upturned end
62 upper channel layer
63 lower channel layer
64 reinforcing channel cover
65 first reinforcement sidewall strip
66 second reinforcement sidewall strip
67 first fiber orientation
68 second fiber orientation
69 fiber angle
71 laminated bamboo ply sheet

DETAILED DESCRIPTION OF THE
PREFERRED EMBODIMENT

Glossary

Sports board: A board used in a sport where the user rides on the board and includes surfboards, sail boards or windsurf boards, wakeboards, wake skates, body boards and snow boards.

Surf board: a sports board used for riding waves.

Stringer: a resilient and flexible elongated support member.

Composite stringer: a stringer made of more than one kind of material.

Figure 2:
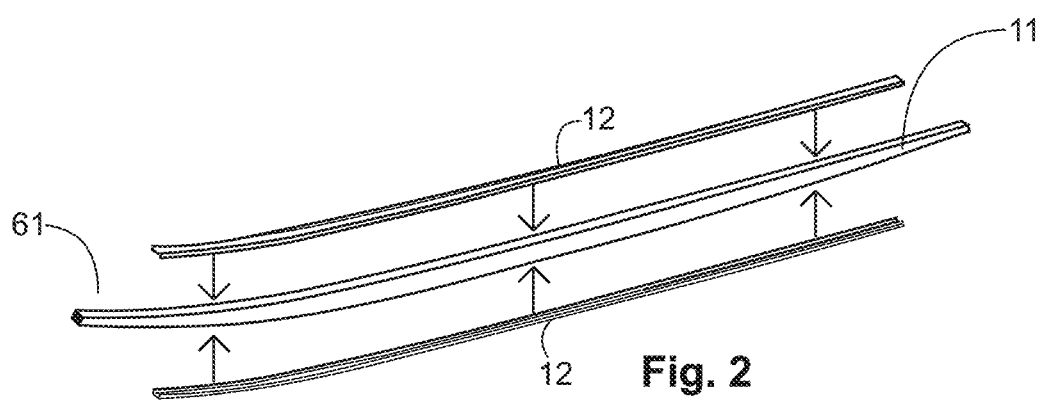
FIG. 2 is a perspective view of the stringer system, illustrating the primary assembly step.
Figure 3:
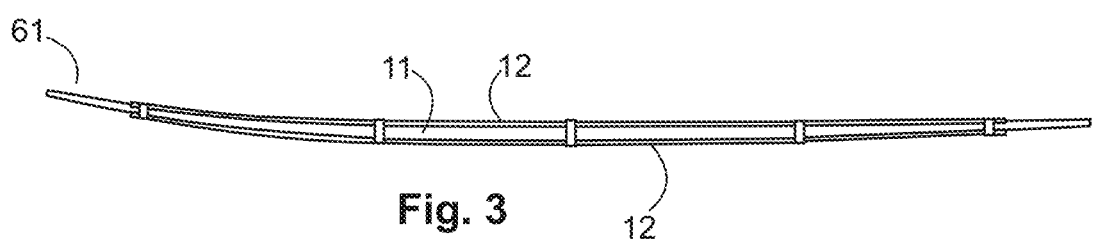
FIG. 3 is a side view of the stringer system after the primary assembly step.
Figure 4:
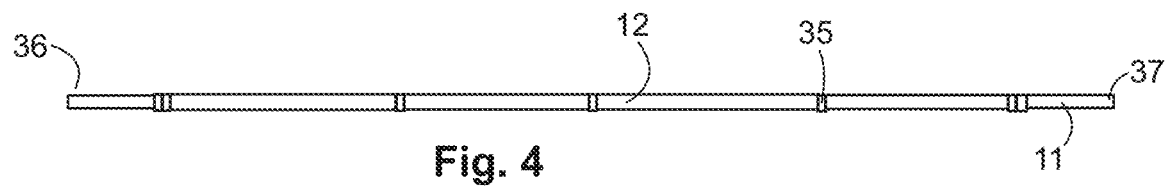
FIG. 4 is a top plan view of the stringer system after the primary assembly step.
Figure 5:
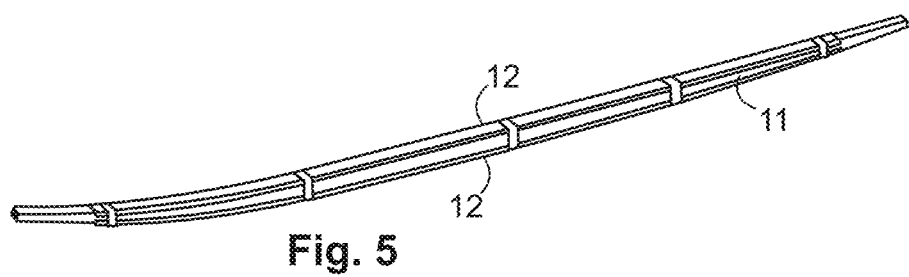
FIG. 5 is a perspective view of the stringer system after the primary assembly step.
Figure 6:
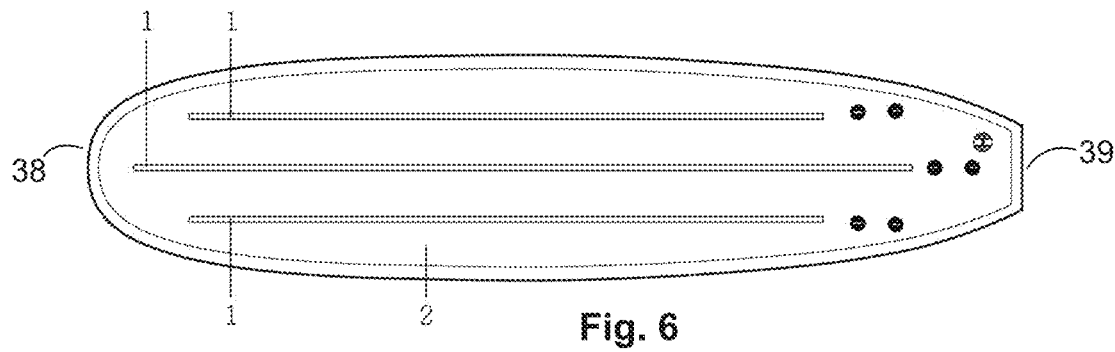
FIG. 6 is a top plan view of a preferred embodiment of surfboard, illustrating the placement of stringer system inside the surfboard.
Figure 7:
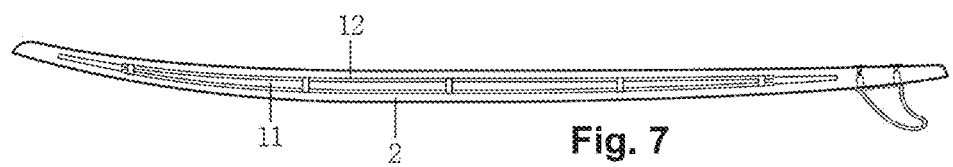
FIG. 7 is a cross-sectional view of the preferred embodiment of surfboard, taken generally along the longitudinal direction of the surfboard.
Figure 8:
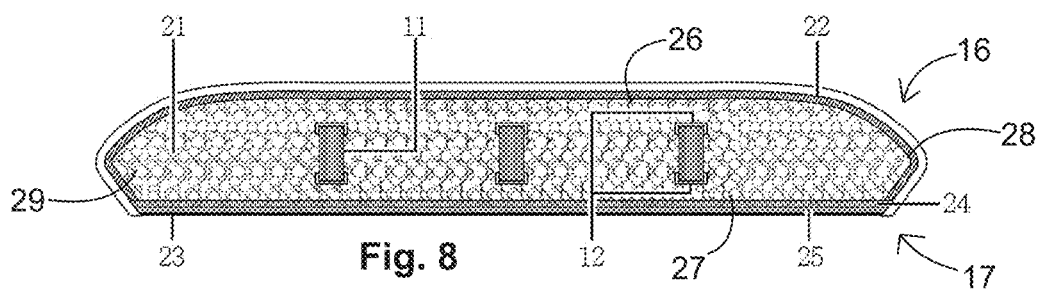
FIG. 8 is a cross-sectional view of the preferred embodiment of surfboard, taken generally along the transverse direction of the surfboard.
Figure 9:
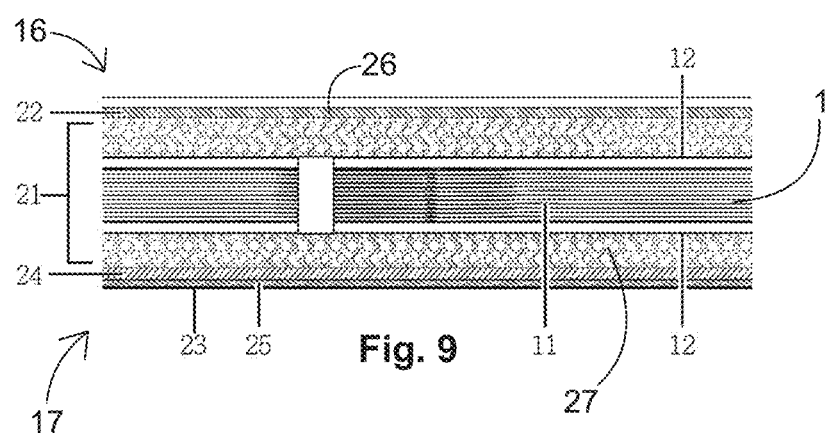
FIG. 9 is a partial cross-sectional view of preferred embodiment of surfboard, taken generally along the longitudinal direction of the surfboard.
Figure 16:
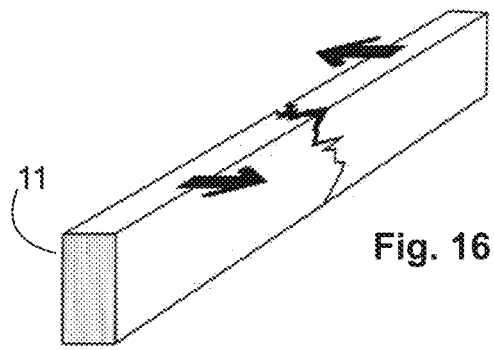
FIG. 16 is a diagram showing stringer breaking.
Figure 17:
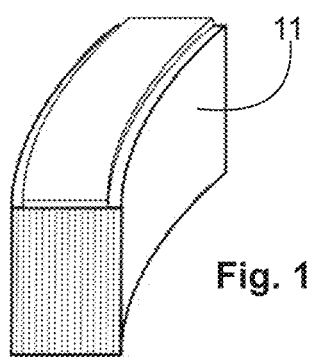
FIG. 17 is a perspective view of a prior art stringer showing stringer bending in a transverse direction.
Figure 18:
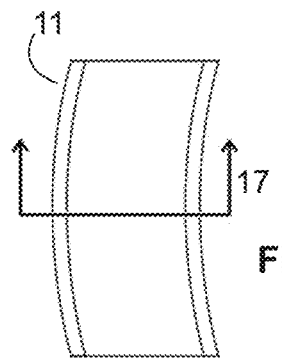
FIG. 18 is a top view diagram showing stringer bending in a transverse direction.
Figure 19:
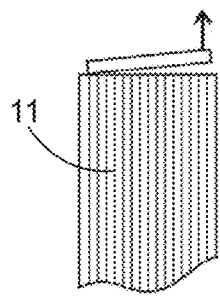
FIG. 19 is a cross-section diagram showing stringer delamination.

As seen in FIG. 1, the break resistant composite stringer system includes a stringer body 11 laminated between a pair of fibrous channels 12. The lamination can be by fiberglass resin, and the pair of fibrous channels 12 can be made in a series of layers of successively cured fiberglass fabric. As seen in FIG. 2, an upturned end 61 provides a hydrodynamic profile. As seen in FIGS. 3-5, the stringer has rebound clips 35, the stringer front end 36, and a stringer rear end 37. As seen in FIG. 6 the stringers 1 are installed into the surfboard 2 along the length of the surfboard and parallel to a line between the surfboard front and 38 and the surfboard rear end 39. As seen in FIG. 7, a stringer body 11 has fibrous channels 12 mounted to the stringer body 11 and mounted inside the surfboard 2.

In the preferred embodiment shown in FIGS. 1-2, the break resistant composite stringer system of the present invention, comprising: a stringer body 11 and fibrous channels 12. The fibrous channels 12 may be adhered only on the top surface or bottom surface of the stringer body 11. In an alternate embodiment, the fibrous channels 12 may be adhered on both the top surface and bottom surface of the stringer body 11. The stringer body 11 may be formed in a linear configuration. The stringer body 11 may has one upturning end or two upturning ends.

In the preferred embodiment shown in FIGS. 1-2, the first preferred embodiment includes a stringer body 11 having one upturning end. Both the top surface and bottom surface of the stringer body 11 are equipped with fibrous channels 12, whereas the fibrous channels 12 adhere to the curved surface of the stringer body 11. The stringer body 11 is formed from high strength materials selected from timber board, plywood board, resin laminated bamboo board, metal tube, plastic board and honeycomb board. Preferable stringer materials are plywood board and resin laminated bamboo board. The stringer body can be made of a laminate wooden structure such as plywood. The plywood optionally includes composite lamination reinforcement within the stringer body 11.

The stringer body 11 is reinforced by fibrous channels. Fibrous channels 12 are formed from synthetic fibrous materials, selected from fiberglass, carbon fiber, other synthetic fibrous materials or mixtures thereof. As illustrated in FIGS. 11 and 13, the upper fibrous channel and the lower fibrous channel both have a web thickness in the range of 0.5 mm to 5 mm, a flange thickness in the range of 0.5 mm to 6 mm, a web width in the range of 5 mm to 30 mm and a flange height in the range of 3 mm to 30 mm. The web width 47 of fibrous channels 12 has a dimension substantially equal to the width 59 of the stringer body. The fibrous channel 12 has a U-shaped cross-section. The strength of the stringer system is mainly contributed by the stringer body 11. The application of fibrous channels 12 on the stringer top surface 33 and stringer bottom surface 34 of the stringer body 11 increases the flexural strength of the stringer system in both the vertical direction and the transverse direction.

The fibrous channels 12 may have a greater web thickness and flange thickness to stiffen the stringer system. However the weight of fibrous channel 12 increases with thickness. An optimum stringer system is a balance between strength and weight. Furthermore, a fibrous channel 12 with thicker cross-section is less flexible and therefore cannot bended to maintain intimate contact with the curved surfaces, in particular at the two ends of the stringer body 11. Alternatively, the stiffness of the composite stringer system can be adjusted to the predetermined desired flex value by employing fibrous channels 12 having different strength. For example, a carbon fiber channel 12 has greater stiffening effect to the composite stringer 1 than a fiberglass channel. Fibrous channels 12 made from strands of monofilament fibers provide the maximum stiffness compared with fibrous channels 12 made from woven fibers. The fibrous channels 12 of the present stringer system are preferable made from strands of fiberglass monofilament because fiberglass channels have high stiffness and yet relative low cost. The fibrous channels 12 may have a length equal or shorter than the stringer body 11. The fibrous channels 12 should cover at least half the length of the stringer body 11. The tensile strength of fibrous channel 12 is higher than the stringer body 11. When the stringer body 11 is equipped with the fibrous channels 12 along the curved surface of the stringer, the stringer system has greatly improved its flex recovery characteristics. As the fibrous channels 12 are securely bonded to the stringer body 11, the fibrous channels 12 function like a spring to evenly distribute any impact force from waves. When the stringer body 11 flex under bending force, the deformation has a stretching effect to the fibrous channels 12. The fibrous channels 12 tend to resist the stretching action from the bending force due to its high tensile strength. The result is that the stringer body 11 has less flex and spring back more quickly under impact force. In addition, surfboard 2 with improved flex recovery is desirable for enhancing maneuverability and performance of the board to the rider. Consequently, the stringer is less prone to breaking, enhancing the safety of the surfboard 2.

The stringer body 11 and the fibrous channels 12 have to be securely bonded together as a unified body in order to ensure that there is no relative movement between the two parts under an external mechanical force. The two components may be bonded by adhesive, screws, rivets, tie straps or other mechanical fasteners. It is desirable to have the entire interface between the fibrous channels 12 and the stringer body 11 tightly bonded together as a unified body.

Preferred bonding method is using adhesive. The adhesive used for bonding the composite stringer 1 should exhibit good wetting property to facilitate good adhesion contact between the channels and the stringer body 11. In addition, the adhesive should demonstrate high bond strength, good toughness and elasticity to tolerate the flex of stringer system induced by the high impact force of ocean wave. The bonding of composite stringer can be by fiberglass resin. Adhesives derived from thermoplastic elastomers with heat resistant and waterproof properties are also desirable for the present application. Good heat resistance is important in the application of surfboards 2 because they are exposed directly to sunlight.

A heat resistant waterproof adhesive is applied between the fibrous channels 12 and the stringer body 11, forming the first heat resistant waterproof adhesive layer. The preferred manufacturing process begins with applying a layer of heat resistant waterproof adhesive to the top surface and bottom surface of the stringer body 11. A layer of heat resistant waterproof adhesive is also applied to the inner surface of the fibrous U channels 12. The melting point of the heat resistant adhesive should be minimum 60° C. The fibrous channels 12 are adhered respectively to the top surface and bottom surface. As shown in FIGS. 3, 4 and 5, several surrounding tapes are applied to temporary fasten the fibrous channels 12 onto the stringer body 11 at suitable separation intervals.

In order to improve waterproof property of stringer and increase the bonding between the stringer and the foam core 21, the entire composite stringer 1 is coated with a second layer of heat resistant waterproof adhesive resin after the fibrous channels 12 being bonded to the stringer body 11 by heat resistant waterproof adhesive layer. The second adhesive layer bonds the composite stringer 1 to the foam core 21 as a unified body. As a result, the second adhesive layer has the function to prevent the stringer from absorbing water and improve the stiffness of the surfboard 2.

During manufacture of the stringer system, the stringer body 11 is made at a width 59 in the range of 5 mm to 30 mm and more preferable in the range of 8 mm to 18 mm. The fibrous channels 12 has a width 44 in the range of 6 mm to 42 mm and more preferable in the range of 9 mm to 30 mm. The fibrous channels 12 has a web thickness 45 in the range of 0.5 mm to 5 mm and more preferable in the range of 1 mm to 3 mm, a flange thickness 46 in the range of 0.5 mm to 6 mm and more preferable in the range of 1 mm to 4 mm, a web width 47 in the range of 5 mm to 30 mm and a flange height 48 in the range of 3 mm to 30 mm. The fibrous channels 12 should be relatively thin and possess the characteristics of good flexibility and light weight. The fibrous channels 12 are flexible and therefore allow the channels to maintain intimate contact with the curved surfaces at the two ends of the stringer body 11. The fibrous channels 12 are light weight and therefore have little impact to the total weight of the stringer system. The present invention facilitates the production of composite stringer system with improved stiffness and break resistance at relatively low material and labor cost.

In an second alternative embodiment, the fibrous channels 12 may be adhered only on the top surface of the stringer body 11. In another third alternative embodiment, the fibrous channels 12 may be adhered only on the bottom surface of the stringer body 11. Both the second and third embodiments will exhibit improvement in the flex recovery and flexural strength of the stringer. Various modifications can be made without departing from the spirit and scope of the invention. For example, the fibrous channels 12 may be adhered on any desirable position of the stringer body 11 and additional number of fibrous channels 12 may be applied to the stringer body 11 according to the requirement of mechanical properties.

As shown in FIGS. 6, 7, 8 and 9, the present invention discloses a break resistant surfboard 2, equipped with the composite stringers 1. The surfboard 2 comprises: a foam core 21, a break resistant composite stringer 1 evenly distributed within the foam core 21, a top laminated foam skin 22 covering the top surface 26 and side rail surfaces 28, 29 of the foam core 21, whereas the top laminated foam skin 22 comprising at least one layer of expanded foam, a bottom laminated foam skin covering the bottom surface of the foam core 21, whereas the bottom laminated foam skin comprising at least one layer of expanded foam and a non-foaming plastic plate 23 laminated to the outer surface of the bottom foam skin 22.

The bottom laminated foam skin 22 includes a plurality of expanded foam layers. In general, the densities of the expanded foam layers increases from inside layer to outside layer for enhancing strength of the bottom structure of surfboard 2. The preferred embodiment shown in FIGS. 8 and 9 includes a bottom laminated foam skin 22 formed by two layers of expanded foam. The two layers of expanded foam are respectively the inner bottom foam layer 24 which laminated to the bottom surface of the foam core 21 and the outer bottom foam layer 25 which laminated to the bottom surface of the inner bottom foam layer 24.

In the preferred embodiment, the foam core 21 has a thickness between 13 mm and 150 mm and preferably a thickness between 25 mm and 90 mm. The foam core 21 has a density between 15 kg/m$^3$ and 65 kg/m$^3$ and preferably a density between 18 kg/m$^3$ and 40 kg/m$^3$. Suitable materials for use as foam core include expanded polystyrene foam (EPS), expanded polypropylene foam (EPP), expanded polyethylene foam (EPE), expanded polyolefin (EPO) and polyurethane foam (PU), whereas polystyrene foam is the preferred foam core 21 material in the present embodiment. The top laminated foam skin 22 has a thickness between 1 mm and 6 mm and preferably a thickness between 3 mm and 5 mm. The top laminated foam skin 22 has a density between 45 kg/m$^3$ and 176 kg/m$^3$ and preferably a density between 56 kg/m$^3$ and 128 kg/m$^3$. Suitable materials for use as top laminated foam skin 22 include polyethylene foam sheet (PE), polypropylene foam sheet (PP) and ethylene vinyl acetate copolymer foam sheet (EVA), whereas polyethylene foam sheet (PE) is the preferred top foam skin 22 in the present embodiment. The bottom laminated foam skin 22 has a thickness between 1 mm and 6 mm and preferably a thickness between 2 mm and 4 mm. The bottom laminated foam skin has a density between 27 kg/m$^3$ and 128 kg/m$^3$ and preferably a thickness between 38 kg/m$^3$ and 104 kg/m$^3$. Suitable materials for use as bottom laminated foam skin 22 include polyethylene foam sheet (PE), polypropylene foam sheet (PP) and ethylene vinyl acetate copolymer foam sheet (EVA), whereas Polyethylene foam sheet (PE) is the preferred bottom foam skin 22 in the present embodiment. The plastic plate 23 has a thickness between 0.1 mm and 2 mm and preferably a thickness between 0.35 mm and 1.2 mm. Preferred materials for use as plastic plate 23 include polyethylene and polypropylene.

The break resistant composite stringer 1 as shown in FIGS. 6 and 7 has a length shorter than the foam core 21. In general, the surfboard 2 of the present invention is equipped with one to five such stringers. The length of the stringer in the center line of the board is usually longer than the stringers located at the two sides. The side stringers are symmetrically installed at two sides. Various modifications may be made whenever necessary. For example, the orientation of the stringers may be installed at an angle inclined with the center line of the surfboard 2 to avoid hitting the fins and allow the stringers extending far enough to the end of tail region.

The foam core 21 has a composite stringer channel 15 for receiving and encapsulating the stringer 1. The composite stringer 1 preferably has a stringer right surface 31 and a stringer left surface 32. The stringer right surface is bonded to the foam core 21 and the stringer left surface is bonded to the foam core 21. The stringer 1 also has a stringer top surface 33 and a stringer bottom surface 34. The fibrous channels 12 includes an upper fibrous channel 13 and a lower fibrous channel 14. The stringer top surface 33 bonded to the upper fibrous channel 13 which is bonded to the foam core 21 and the stringer bottom surface 34 is bonded to the lower fibrous channel 14 which is in turn bonded to the foam core 21. The stringer top surface can be thermally laminated or adhered to the upper fibrous channel 13 and the stringer bottom surface 34 can be thermally laminated or adhered to the lower fibrous channel 14.

The stringer 1 has a stringer front end 36 and a stringer rear end 37. The stringer front end 36 is at a surfboard front end 38 and the stringer rear end 37 is at a surfboard rear end 39. The composite stringer 1 is generally parallel to the surfboard 2. The composite stringer 1 may also have a stringer body 11 with an upturned end at either the stringer front end 36 or the stringer rear end 37.

The rebound clips 35 retain the layers of the composite stringer 1 together. The rebound clips 35 can be formed of fiberglass wrapping where a channel 12 of fiberglass is wrapped around the stringer right surface 31, the stringer top surface 33, the stringer left surface 32, and the stringer bottom surface 34. The rebound clips 35 are preferably spaced apart from each other at regular intervals along the length of the composite stringer 1. The stringer is a composite leaf spring. The fibrous channels may have a multi-layer construction of two or more layers of fiberglass. The fiber orientation of the first upper fibrous channel 13 can be different than the fiber orientation of the second upper fibrous channel 41. Similarly, the fiber orientation of the first lower fibrous channel 14 can be different than the fiber orientation of the second lower fibrous channel 42.

The upper fibrous channel 13 can be secured to the stringer top surface 33 with an upper fibrous channel adhesive layer 46. The lower fibrous channel 14 can be secured to the stringer bottom surface 34 with a lower fibrous channel adhesive layer 47. The upper fibrous channel 14 and the lower fibrous channel 13 are in turn adhered to the foam core 21. The foam core 21 has a foam core top surface 26 that opposes a foam core bottom surface 27. The foam core right rail surface 28 opposes the foam core left rail surface 29. The foam core 21 preferably includes one or more composite stringer channels 15 for receiving composite stringers. A plastic plate 23 can be directly laminated to the foam core bottom surface 27, or preferably the plastic plate 23 is laminated to a lower surface of the bottom laminated foam skin 22.

As seen in FIGS. 6-9, the break resistant composite stringer 1 can be made as a surfboard 2 or sports board by adding a foam core 21 having a foam core top surface 26, a foam core bottom surface 27, a foam core right rail surface 28 and a foam core left rail surface 29. A composite stringer channel 15 formed in the foam core 21, wherein the composite stringer channel 15 is configured to receive the composite stringer 1. A top laminated foam skin 22 covers the foam core top surface 26, the foam core right rail surface 28 and the foam core left rail surface 29. The top laminated foam skin 22 includes at least one layer of expanded foam. A bottom laminated foam skin covers the foam core bottom surface. The bottom laminated foam skin has at least one layer of expanded foam. A plastic plate 23 is laminated to a lower surface of the bottom laminated foam skin. The composite stringer 1 can be shorter than the foam core 21.

As seen in FIGS. 11, 12 and 13, the break resistant composite stringer system includes a stringer body 11 having a stringer top surface 33, stringer bottom surface 34, stringer left surface 32 and a stringer right surface 31. As seen in FIG. 11, an upper fibrous U channel 13 is adhered to the stringer body 11 at the stringer top surface 33, and a lower fibrous U channel 14 is adhered to the stringer body 11 at the stringer bottom surface 34. The stringer body 11, upper fibrous channel 13 and the lower fibrous channel 14 form a composite stringer 1. The elongated stringer body is made of wood having a grain parallel to the upper U channel, and parallel to the lower U channel. In a preferred embodiment, the elongated stringer body is made of a laminated bamboo board composed of a number of long bamboo strips vertically piled side by side on the thickness surface of bamboo strips and the strips being aligned substantially in parallel to the longitudinal axis of surfboard. The bamboo strips of the laminated bamboo ply board 71 can be thin strips and are vertically oriented. The laminated bamboo ply board 71 can be made of a multilayer laminate stack of bamboo strips, such as by forming a two plies or more plies of bamboo strips layers across the stringer thickness dimension.

As seen in FIG. 11, the stringer body 11 has a stringer front end 36 and a stringer rear end 37. The stringer front end 36 or the stringer rear end 37 is upturned so that it is an upturned end 61. The upper fibrous channel 13 is adhered to the stringer body 11 from the stringer front end 36 to the stringer rear end 37 and the lower fibrous channel 14 is adhered to the stringer body 11 from the stringer front end 36 to the stringer rear end 37. The upper fibrous channel 13 and the lower fibrous channel 14 both have a length equal or shorter than the stringer body 11. The upper fibrous channel 13 and the lower fibrous channel 14 have a web width dimension substantially equal to the stringer body 11 thickness dimension. An upper fibrous channel adhesive layer 56 is formed of a heat-activated rubber based adhesive. The upper fibrous channel adhesive layer 56 is a heat resistant and waterproof adhesive layer interposed between the upper fibrous channel 13 and the stringer top surface 33. A lower fibrous channel adhesive layer 57 is formed of a heat-activated rubber based adhesive. The lower fibrous channel adhesive layer 57 is a heat resistant and waterproof adhesive layer is interposed between the lower fibrous channel 14 and the stringer bottom surface 34.

The second layer of heat resistant waterproof adhesive can cover the fibrous channels 12 and stringer body 11 after the fibrous channels 12 are bonded to the stringer body 11 to form a composite stringer 1. The stringer body 11 can have a width in the range of 5 mm to 30 mm. Preferably, the upper fibrous channel 13 and the lower fibrous channel 14 both have a web thickness in the range of 0.5 mm to 5 mm, a flange thickness in the range of 0.5 mm to 6 mm, a web width in the range of 5 mm to 30 mm and a flange height in the range of 3 mm to 30 mm. As seen in FIGS. 11-13, the break resistant composite stringer system includes a stringer body having a stringer top surface 33, stringer bottom surface 34, stringer right surface 31 and stringer left surface 32 and an upper fibrous channel adhered to the stringer body at the stringer top surface, and a lower fibrous channel adhered to the stringer body at the stringer bottom surface. The stringer body, upper fibrous channel and the lower fibrous channel form a composite stringer. As shown in FIG. 11 and FIG. 13, the fibrous U channel has one web section and two flange sections. The fibrous U channel has an inner web surface 43, outer web surface 49, right flange surface 41 and left flange surface 42. One important advantage of the present composite stringer structure is the strong bonding between the fibrous channel and the stringer body.

Additionally, a second layer of heat resistant waterproof adhesive 55 can encapsulate the stringer. Since wood stringers are vulnerable to water, water invasion from fin holes may seep into the foam core 21. The second layer of heat resistant waterproof adhesive 55 prevents water absorption, and also bonds the stringer to the foam core.

With reference to FIGS. 11-13, the inner web surface of fibrous U channel is bonded to the stringer top surface. Furthermore, the right flange surface of fibrous U channel is bonded to the stringer right surface and the left flange surface of fibrous U channel is bonded to the stringer left surface. When the composite stringer system is subjected to big impact, the deformation of the composite stringer system is under constraint, rather than wrapping freely.

Figure 20:
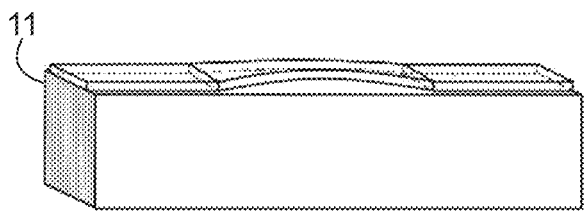
FIG. 20 is a diagram showing stringer delamination.
Figure 21:
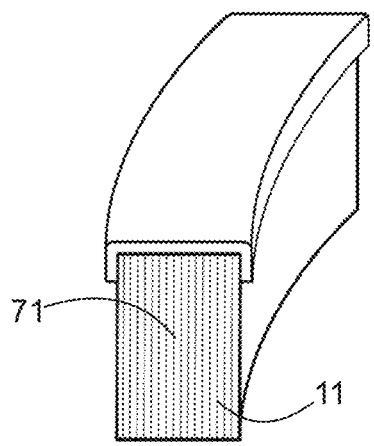
FIG. 21 is a perspective view of preferred embodiment showing stringer bending in a transverse direction.
Figure 22:
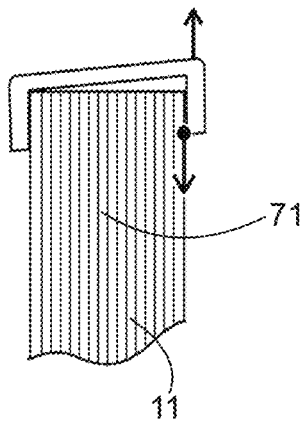
FIG. 22 is a cross-section diagram showing forces on the cross-section of U channel and stringer body.
Figure 23:
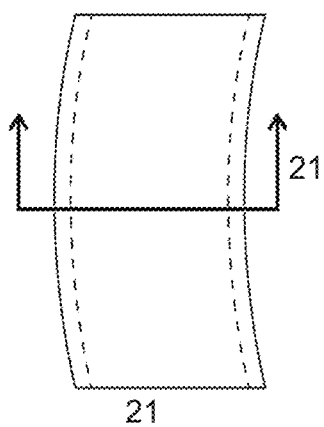
FIG. 23 is a top view diagram showing stringer bending of the preferred embodiment in a transverse direction.
Figure 24:
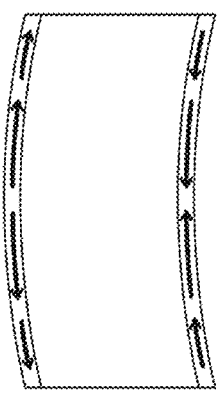
FIG. 24 is a top view diagram showing stringer force distribution on the cross-section of U channel.

As illustrated in FIGS. 21 and 22, a compression force and a tension force will develop in the two flange sections when the stringer system is subjected to a transverse bending force. The compression force in the flange section may cause a buckling failure of the fibrous channel in the right edge of the stringer and a schematic diagram illustrates the failure mode in FIG. 20.

However the lifting force on the right flange of fibrous U channel is restricted by the shearing force of bonding between the right flange surface of U channel and the stringer right surface. It is well known that adhesive bonding force is higher when subjected to a shearing stress than tensile stress. It should be emphasized that the strong bonding between the fibrous channel and the stringer body is partly contributed by the increased bonding area due to the U-shaped geometry of the channel. The high bonding force in the vertical wall area of the left and right flange surfaces is an important contribution to the high impact resistant property of the composite stringer system. In addition, when the composite stringer system is subjected to a bending deformation as shown in FIGS. 21 and 22, the compression force developed in right flange section and the tensile force developed in the left flange section will work like a spring to reflex the stringer body back to its neutral position. Therefore the design of the left and right flange sections of the fibrous U channel can greatly restrict the deformation of the composite stringer in the transverse direction due to the mechanical stiffening of the U section. The fibrous U channels may have a greater flange thickness to stiffen the stringer system against deformation in the transverse direction. Therefore it is desirable to design the U channel having the flange thickness larger than the web thickness. An optimum stringer system is a balance between strength and weight. Therefore the thickness of flange section should be designed for a suitable thickness to achieve a proper balance between strength and weight of the composite stringer system.

As discussed above, the cross-section of a conventional wood stringer shown in FIG. 12 is designed having the dimension in the vertical direction (height) larger than that of the horizontal direction (width). The resulting stringer exhibits a higher stiffness in the vertical direction under the same material weight. It is therefore desirable to make the width of wood stringer to a smaller thickness. Such a design is applicable to a conventional hard surfboard because the wood stringer is connected to a deck skin and bottom skin which are both typically a layer of fiberglass cloth and resin coating, forming a structure of hard shell on the outer surfaces of the surfboard. The strength of hard surfboard is mainly contributed by the hard shell of fiberglass cloth and resins. In contrast, soft surfboards usually do not utilize any resin impregnated fibers in the layered structure. Therefore the stringer system of a soft surfboard takes up the weight of the rider and is responsible for the stiffness of the board. It is not feasible to make the width of stringer too narrow in the case of soft surfboard because the stringer will be broken under wave impact in surfing. With the application of the fibrous U channels to stiffen the wood stringer, it may become possible to utilize a wood stringer beam with smaller width to reduce the weight of the stringer system and yet the resulting composite stringer system is still break resistant in wave surfing. The design of the present composite stringer system provides a significant improvement to the break resistance of conventional soft surfboard.

Figure 25:
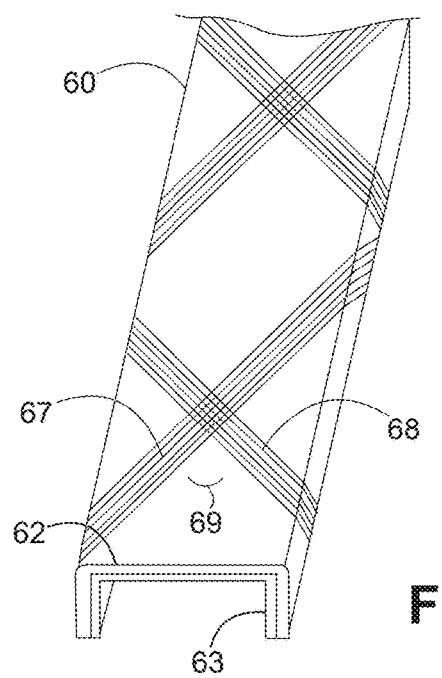
FIG. 25 is diagram showing a possible cross-section U channel fiberglass layup construction, which could be an upper fibrous channel or lower fibrous channel.

FIG. 25 is diagram showing a possible cross-section U channel fiberglass layup construction showing that the U channel member has a multilayer construction of two layers of fiberglass. An upper channel layer 62 can overlie a lower channel layer 63. The upper channel layer 62 can have a first fiber orientation 67 and the lower channel layer 63 can have a second fiber orientation 68. The fiber angle 69 between the first fiber orientation 67 and the second fiber orientation 68 is preferably more than 30°. The configuration permits the U channel to perform with controlled torsion flexibility.

Figure 26:
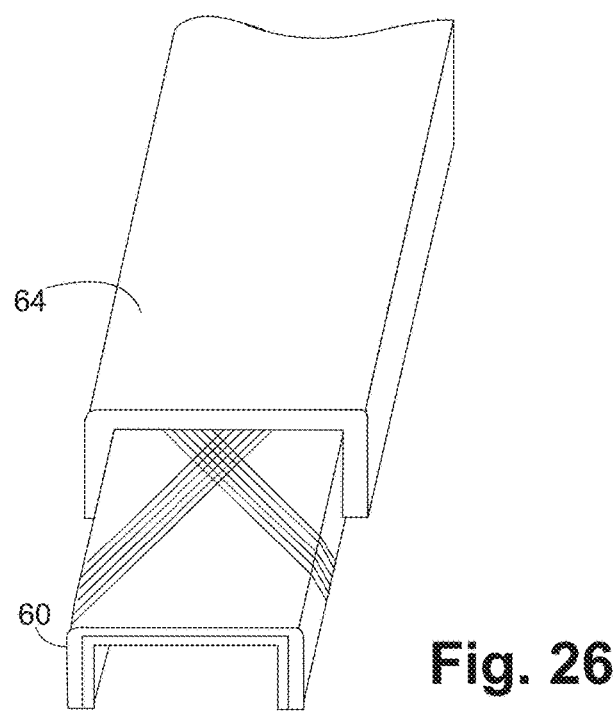
FIG. 26 is diagram showing a possible cross-section U channel fiberglass layup construction, which could be an upper fibrous channel or lower fibrous channel.

FIG. 26 is diagram showing a possible cross-section U channel fiberglass with a layup construction of an additional fiberglass reinforcement channel cover 64. The fiberglass is preferably a monofilament fiberglass with fiber orientation aligns parallel lengthwise along the longitudinal direction of the fibrous U channel for stiffening the flexural strength of the composite stringer.

Figure 27:
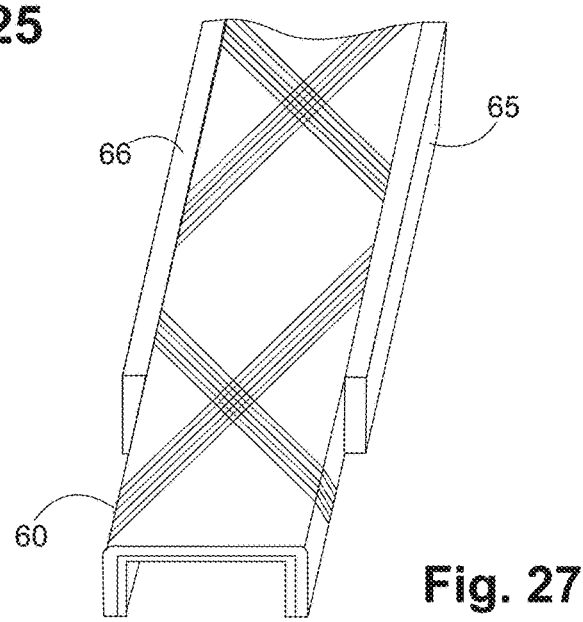
FIG. 27 is diagram showing a possible cross-section U channel fiberglass layup construction, which could be an upper fibrous channel or lower fibrous channel.

FIG. 27 is diagram showing a possible cross-section U channel fiberglass layup construction with a pair of reinforcement sidewalls laminated to the upper fibrous channel 13. The upper fibrous channel 13 is in turn laminated to the stringer body 11. The pair of reinforcement sidewalls may include a first reinforcement sidewall sheet 65 and a second reinforcement sidewall sheet 66. The first reinforcement sidewall sheet is vertically oriented, and the second reinforcement sidewall sheet is also vertically oriented. The reinforcement sidewalls may be made in the form of fibrous strips consisting of fiberglass, carbon fiber or other synthetic fibrous materials. The fibrous strips are preferably made from strands of monofilament fibers and the fiber orientation of reinforcement sidewall preferably aligns along the longitudinal direction of the fibrous U channel for stiffening the flexural strength of the composite stringer in the transverse direction.

While the particular embodiments of the invention have been illustrated and described above, it will be apparent that various modifications can be made without departing from the spirit and scope of the invention. Accordingly, it is not intended that the invention be limited by such variations, modifications and improvements.

The invention claimed is:
1. A sports board comprising:
   a. a sports board front end, and a sports board rear end;
   b. a break resistant composite stringer system including:
      i. an elongated stringer body having a stringer top surface, a stringer bottom surface, a stringer left surface and a stringer right surface, and;
      ii. an upper fibrous channel formed as an upper U channel, wherein the upper U channel is fibrous and includes an upper U channel right flange and an upper U channel left flange, wherein the upper U channel right flange is vertically oriented and wherein the upper U channel left flange is vertically oriented, wherein an inside surface of the upper U channel is bonded to the stringer right surface, the stringer top surface, and the stringer left surface; and
      iii. a lower fibrous channel formed as a lower U channel, wherein the lower U channel is fibrous and includes a lower U channel right flange and a lower U channel left flange, wherein the lower U channel right flange is vertically oriented and wherein the lower U channel left flange is vertically oriented, wherein an inside surface of the lower U channel is bonded to the stringer right surface, the stringer bottom surface, and the stringer left surface;
   c. a foam core, wherein the foam core covers the break resistant composite stringer system; and
   d. a foam skin, wherein the foam skin covers the foam core, wherein the upper fibrous channel and the lower fibrous channel both have a web thickness in the range of 0.5 mm to 5 mm, a flange thickness in the range of 0.5 mm to 6 mm, a web width in the range of 5 mm to 30 mm and a flange height in the range of 3 mm to 30 mm, wherein the upper fibrous channel and the lower fibrous channel are made in multiple layers including an upper channel layer and a lower channel layer.

2. The sports board of claim 1, wherein an inner bottom foam layer is laminated to a lower surface of the foam core, wherein an outer bottom foam layer is laminated to the inner bottom foam layer, wherein a plastic plate is laminated to the outer bottom foam layer.

3. The sports board of claim 1, wherein the stringer body has a width in the range of 5 mm to 30 mm.

4. The sports board of claim 1, wherein a web width of the fibrous channels has a dimension substantially equal to a width of the stringer body.

5. The sports board of claim 1, wherein the upper fibrous channel and the lower fibrous channel are both made of fiberglass.

6. The sports board of claim 1, wherein the elongated stringer body is made of wood having a grain parallel to the upper U channel, and parallel to the lower U channel.

7. The sports board of claim 1, wherein the upper fibrous channel and lower fibrous channel are reinforced by a first reinforcement sidewall strip and a second reinforcement sidewall strip, wherein the first reinforcement sidewall sheet is vertically oriented, and wherein the second reinforcement sidewall sheet is also vertically oriented.

8. The sports board of claim 1, wherein the upper fibrous channel is made of an upper channel layer with a first fiber orientation and a lower channel layer with a second fiber orientation, wherein a fiber angle between the first fiber orientation and the second fiber orientation is greater than 30 degrees.

* * * * *